United States Patent [19]
Lenoski et al.

[11] Patent Number: 5,132,927
[45] Date of Patent: Jul. 21, 1992

[54] SYSTEM FOR CACHE SPACE ALLOCATION USING SELECTIVE ADDRESSING

[75] Inventors: Daniel Lenoski, Cupertino; Albert Jordan, Mountain View, both of Calif.

[73] Assignee: Tandem Computers Incorporated, Cupertino, Calif.

[21] Appl. No.: 594,588

[22] Filed: Oct. 9, 1990

[51] Int. Cl.⁵ .............................................. G11C 13/00
[52] U.S. Cl. ...................................... 365/49; 365/207; 365/230.01
[58] Field of Search ................ 365/49, 189.01, 189.03, 365/189.04, 207, 230.01, 230.05

[56] References Cited
U.S. PATENT DOCUMENTS
4,922,461  5/1990  Hayakawa et al. ................ 365/207

Primary Examiner—Terrell W. Fears
Attorney, Agent, or Firm—Townsend and Townsend

[57] ABSTRACT

A system for folding the address space of a reserved segment of a high speed memory into a designated part of the address space of a cache memory included in the high speed memory. Folding information for distinguishing between cache entries that have been folded from reserved segments and those that normally map into a designated segment of the high speed memory is stored. The folding information is utilized to determine whether a cache miss occurs when the designated segment of the cache memory is accessed.

4 Claims, 1 Drawing Sheet

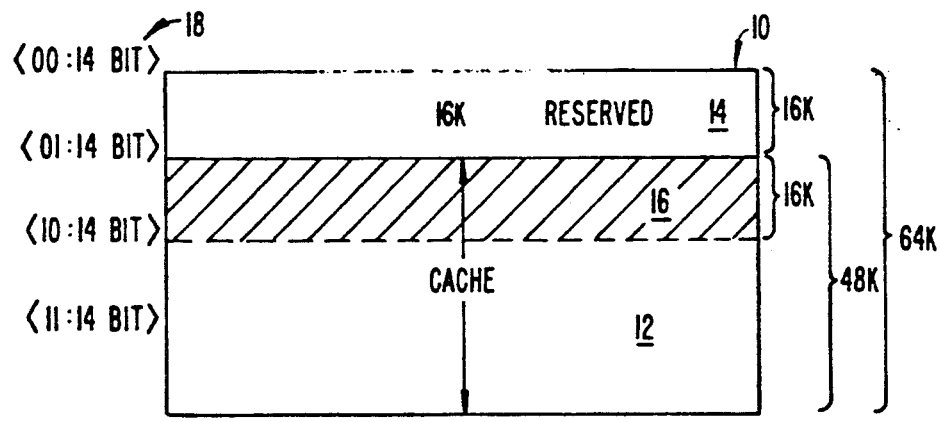
FIG. 1.
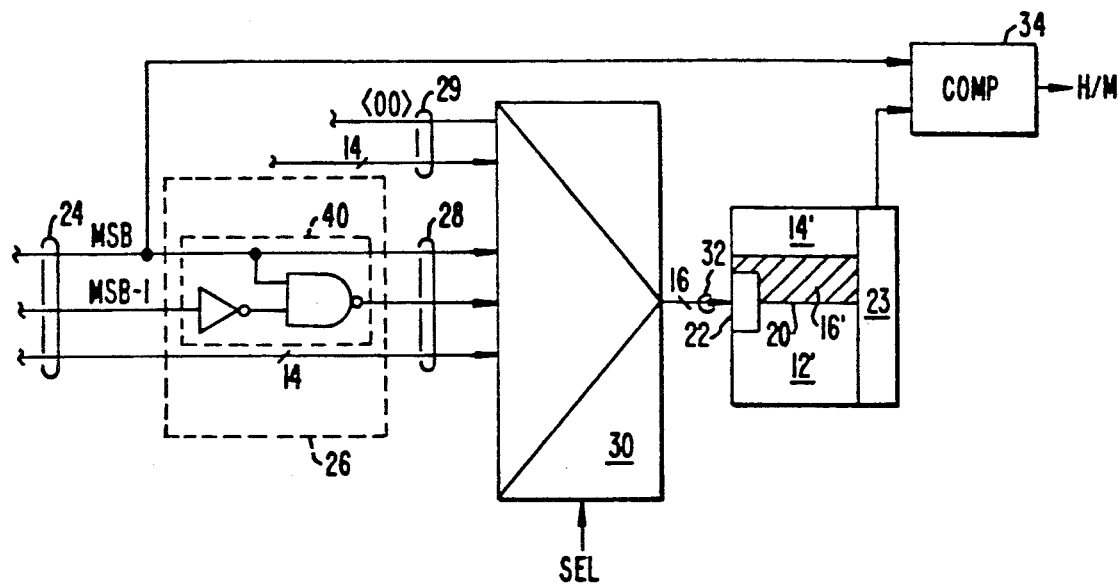
FIG. 2.
| UNMODIFIED | | CONVERTED | |
|---|---|---|---|
| MSB | MSB-1 | MSB | MSB-1 |
| 0 | 0 | 0 | 1 |
| 0 | 1 | 0 | 1 |
| 1 | 0 | 1 | 0 |
| 1 | 1 | 1 | 1 |
FIG. 3.

SYSTEM FOR CACHE SPACE ALLOCATION USING SELECTIVE ADDRESSING

BACKGROUND OF THE INVENTION

The invention relates generally to address generation and more particular to address generation for a memory having a total number of storage locations not equal to a power of 2.

Generally, memory banks include $2^n$ storage locations, where n is an integer. Examples include 8K (or 8×1024), 16K, 64K, and 128K memory units. The memory cells can then be accessed utilizing n-bit binary addresses.

In many systems the memory is divided into a large main memory consisting of slow inexpensive hardware and small cache memory consisting of high speed expensive hardware. Systems are designed to move the data in main memory most likely to be used by a program into the cache.

In a typical cache memory system, the main memory is made up of $2^M$ blocks, each $2^B$ bytes in size. The cache consists of $2^N$ cache entries, each entry holding one memory block. Because N is much less than M, the system must map multiple main memory blocks to individual cache entries. In order to differentiate which particular memory block resides in a cache entry at a given time, each cache entry includes additional address information known as tag. The tag contains enough addressing information to fully disambiguate which of the main memory blocks is currently held by that entry.

As an example, if the cache entry is selected by the least significant N bits of a main memory block address, then $2^{M-N}$ main memory blocks would map to each cache entry. A tag consisting of the most significant M−N main memory address bits would be sufficient to distinguish which memory block the cache entry contains.

When a CPU accesses a particular main memory location it will first attempt to find the data to be accessed in the cache. The system uses a portion of the main memory address to address the cache and retrieve the cache data and its associated tag. The remaining portion of the main memory address is compared with the tag to determine whether the block in cache corresponds to the desired main memory block. If so, the data can be returned to the CPU. Otherwise, the full main memory address must be used to retrieve the data from the main memory.

There are many conventions for mapping main memory into cache memory and techniques for refilling the cache in the case of cache misses which are well-known in the art. These conventions and techniques are generally described in the book by R. Matick entitled Computer Storage Systems & Technology, John Wiley & Sons, 1977, which is hereby incorporated by reference.

In some systems it is desirable to reserve a portion of the high speed memory usually used as cache memory for other purposes such as storage of microcode or a cache of page table translations. Accordingly, some of the storage space of the high speed memory accessed by the least significant N bits of the generated main memory address will access storage locations that do not store main memory data. Additionally, the unreserved part of the high speed memory used as cache memory will have $2^N - R = L$ cache entries, where R is the number of cache entries reserved for other use and L is not generally equal to a power of 2. If L is not a power of 2 then it is not possible for any Z bit binary address to have a one to one correspondence between the $2^Z$ possible addresses and the L cache entries.

SUMMARY OF THE INVENTION

The present invention is a system for addressing a cache memory having L, where L is not a generally a power of 2, storage locations that is a portion of a high speed memory having $2^N$ storage locations. The remaining portion of the high speed memory is reserved for uses other than cache memory.

According to one aspect of the invention, the least significant N bits of an address generated by the CPU (the unmodified cache address) are transferred to an address modification unit. If the unmodified address selects a storage location in the high speed memory included in the cache memory then the unmodified address is not modified by the address modification unit. If the unmodified address is in a reserved address space, i.e, an address that selects a storage location in the reserved portion of the high speed memory, then it is modified into an address in a designated address space that selects a storage location in a designated part of the cache memory.

According to another aspect of the invention, additional folding information is stored in the tag field of each cache entry to distinguish blocks in the designated area. This folding information differentiates memory blocks that normally map to the designated portion of the cache from those that would have mapped to the reserved portion of the high speed memory.

Other features and advantages of the invention will be apparent in view of the drawings and following detailed description.

BRIEF SUMMARY OF THE DRAWINGS

FIG. 1 is a schematic diagram of the memory space of a high speed memory;

FIG. 2 is a schematic diagram of an address modification system; and

FIG. 3 is a truth table for a logic unit in the address modification unit.

DETAILED DESCRIPTION OF THE PREFERRED EMBODIMENTS

FIG. 1 is a schematic diagram of the address space 10 of a high speed memory having a portion 12 used as a cache memory and a having a reserved address space portion 14 used for other purposes such as storing microcode and cache page tables. In FIG. 1, a memory space 10 is depicted with the first 16K 14 reserved and the remaining 48K 12 utilized for cache memory. Thus, the number of addresses in the cache memory address space 12 is not equal to a power of 2.

In the system illustrated a CPU generates a 32-bit address with the lower 16 bits used as the cache memory address 18 and the upper 16 bits used as tag.

The address space 10 of the high speed memory is divided into quarters with the two most significant bits (MSBs) of cache memory address 18 defining the boundaries of the quarters. The first quarter 14 of the address space is reserved for non-cache memory uses so that addresses having <00> as the two MSBs will access storage locations that are not used for cache memory. The second quarter 16 of the address space is a designated space which is part of the cache memory 12. Addresses that access storage locations in this space have <01> as the two most significant bits.

FIG. 2 is a schematic diagram of the cache memory addressing system. A 64 Kbyte high speed memory 20 has a 16 bit address port 22. The high speed memory 20 includes a reserved segment 14' of R storage locations addressed by N-bit addresses in the reserved address space 14 and a designated segment 16' of R storage locations addressed by N-bit addresses in the designated address space 16. Tag information is stored in a tag store 23. A first 16 bit address bus 24 is coupled to the input port of an address modification unit 26. A second 16 bit bus 28 couples the output port of the address modification unit 26 to the first input port of MUX 30. A third 16 bit address bus 29 is coupled to the second input port of the MUX 30 and a MUX control port is coupled to receive a SEL signal. The output port of the MUX 30 is coupled the address port 22 of the high speed memory by a fourth 16 bit data bus 32.

The address modification unit 26 includes a logic network 40 having the two most significant bits, MSB and MSB-1, of the 16 bit unmodified cache address as its inputs and the two most significant bits of a modified cache address as its outputs.

FIG. 3 is a truth table of the logic network 40. In FIG. 3, if the two most significant bits are <00> then the unmodified address accesses a storage location in the reserved segment 14'. These bits are modified to <01> so that the modified address accesses a storage location in the designated segment 16'. Therefore, no storage locations in the reserved segment 14' may be accessed by cache memory addresses. The unmodified addresses having two most significant bits of <01>, <10>, and <11> are not modified by the logic network 40. Thus, the two MSBs of the cache address are a subfield indicating whether a cache address is included in either the reserved or designated address spaces 14 and 16. The bit MSB-1 is a modifiable part of the subfield that is modified by the address modification unit 26 to convert addresses in the reserved address space 14 into addresses in the designated address space 16.

Accordingly, the unmodified addresses in the reserved space 14 are converted into modified addresses in the designated space 16 of the cache memory address space 12. Other unmodified addresses are not converted by the address modification unit 26.

It is apparent that the reserved space 14 has been folded into the designated space 16 by the address modification operation i.e., the unmodified addresses in the reserved space 14 have been converted into modified addresses equal to particular addresses in the designated 16 Thus, extra folding information must be added to the stored tag to indicate whether the data stored in a location in the designated segment 16' is the same as main memory data stored in a location specified by an unmodified address in the reserved address space 14 or specified by an unmodified address in the designated address space 16.

In the event of a cache miss the unmodified address is utilized to access the main memory. The folding information is in the form of an extra folding bit in the stored tag field that indicates whether the data in the storage locations of the designated segment 16' is main memory data stored in a location having a ZERO as the MSB-1 of its lower 16 bit address or having a ONE as the MSB-1 of its lower 16 bit address.

During a cache memory access, the MSB-1 of the unmodified address is compared in a comparator 34 to the folding information in the stored tag field. If the MSB-1 and folding bit are the same then the correct data is stored in the cache provided that the remaining tag fields are the same. If the MSB-1 and folding bit are not the same then the data in the cache is not the correct data.

If the CPU is accessing non-cache storage locations in the reserved segment 14' of high speed memory unit 20 then the SEL signal is set to select the second input port of the MUX 30. A 14 bit address is provided by the CPU and the two MSBs are hardwired to <00> to form a 16-bit address for accessing storage locations in the reserved segment 14' of the high speed memory.

The invention has now been described with reference to a preferred embodiment. Alternatives and substitutions will now be apparent to persons of ordinary skill in the art. In particular the high speed memory may be divided into any number of segment equal to a power of 2. For example, 8 or 16 segments, and a reserved segment can be folded into the cache memory using the address modification system described. As is well known, the segments will be selected by a subfield of the full N-bit address for the high speed memory. A part of this subfield can be modified by a logic network to fold a reserved segment into another segment of the high speed memory. Further, the high-speed memory can have multiple reserved segments, each of which are folded into designated segments. Each designated segment entry must have enough additional tag bits to distinguish between entries that have been folded from reserved segments and those that normally map into the designated segment. Additionally, the reserved segment may be any segment of the divided high speed memory and the designated segment and reserved segment need not be adjacent. Accordingly, it is not intended to limit the invention except as provided by the appended claims.

What is claimed is:

1. An improved system for addressing a cache memory comprising:
a memory unit having $2^N$ storage locations, with each storage location uniquely selected by an N-bit address supplied to an address port, with the memory unit including a cache memory having L cache storage locations, where L is an integer not necessarily equal to a power of 2, a reserved segment of R storage locations that are excluded from the cache memory and are accessed by addresses in a reserved address space, and a designated segment of R storage locations that are included in the cache memory and are accessed by addresses in a designated address space, where N and R are integers and R is less than $2^N$, where each cache storage location stores a cache data element and a tag field comprising a normal tag, where the cache data element in cache storage locations not included in the designated segment is the same as a data element stored in a main memory storage location selected by a combination of the N bit address that selects the cache storage location and the normal tag stored in the tag field;
an address modification unit, having an input port for receiving an N-bit unmodified address and an output port for providing an N-bit output address, with the output port coupled to the address port of said memory unit, said address modification unit for transforming unmodified addresses in the reserved address space into associated modified output addresses in the designated address space, where a data element stored in cache storage locations in the designated segment is either a folded data element, which is the same as a data element stored in a main memory storage location selected by a combination of a given unmodified address included in said reserved address space and the normal tag stored in the tag field, or is an unfolded data element, which is the same as a data element stored in a main memory storage location selected by a combination of a given unmodified address in said designated address space and the normal tag stored in the tag field;

additional tag storage for storing folding information, said folding information indicating whether a data element stored in a given cache memory storage location accessed by a given output address in said designated address space is a folded data element or an unfolded data element;

means for utilizing said folding information to access data from a given cache storage location in said designated segment only if a data element stored in said given cache storage location is the same as a data element stored in a main memory storage location accessed by a combination of an unmodified address and the normal tag stored in the tag field.

2. The system of claim 1 wherein each N-bit address in the reserved and designated address spaces has an included selecting subfield that indicates whether the N-bit address is in the reserved or designated address space and wherein said address modification unit comprises:

a logic network for modifying a modifiable part of said included selecting subfield to convert an included selecting subfield indicating that an N-bit cache address is in the reserved address space into a selecting subfield indicating that the N-bit address is in the designated address space.

3. The system of claim 2 wherein said folding information comprises the modifiable part of the selecting subfield of an unmodified N-bit address utilized to write main memory data into the cache and wherein said means for utilizing comprises:

a comparator for comparing the folding information for a cache memory storage location in the designated space selected by a modified cache memory address with the modifiable part of the selecting subfield of the associated unmodified cache memory address.

4. The system of claim 3 wherein said memory unit includes multiple reserved and designated segments.

* * * * *